US007844105B2

(12) United States Patent
Pfister et al.

(10) Patent No.: US 7,844,105 B2
(45) Date of Patent: *Nov. 30, 2010

(54) METHOD AND SYSTEM FOR DETERMINING OBJECTS POSES FROM RANGE IMAGES

(75) Inventors: Hanspeter Pfister, Arlington, MA (US); Marcel Germann, Zurich (CH); Michael D. Breitenstein, Lenzburg (CH)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 890 days.

This patent is subject to a terminal disclaimer.

(21) Appl. No.: 11/738,642

(22) Filed: Apr. 23, 2007

(65) Prior Publication Data

US 2008/0260238 A1 Oct. 23, 2008

(51) Int. Cl.
*G06K 9/00* (2006.01)
(52) U.S. Cl. .............. 382/154; 382/100; 382/262; 382/264; 382/266
(58) Field of Classification Search ............... None
See application file for complete search history.

(56) References Cited

U.S. PATENT DOCUMENTS

| | | | | |
|---|---|---|---|---|
| 6,556,196 B1 * | 4/2003 | Blanz et al. | | 345/419 |
| 7,221,809 B2 * | 5/2007 | Geng | | 382/280 |
| 7,714,872 B2 * | 5/2010 | Aoki | | 345/582 |
| 2003/0123713 A1 * | 7/2003 | Geng | | 382/118 |
| 2004/0252862 A1 | 12/2004 | Camus | | |
| 2005/0025383 A1 * | 2/2005 | Domingo et al. | | 382/266 |
| 2008/0192063 A1 * | 8/2008 | Liao et al. | | 345/582 |

OTHER PUBLICATIONS

Moghaddam et al., "Model-based 3D face capture with shape-form-silhouettes," Oct. 17, 2003, IEEE, pp. 20-27.*
Bailey, "An Efficient Euclidean Distance Transform," 2004, IWCIA, pp. 394-408.*

* cited by examiner

*Primary Examiner*—Samir A. Ahmed
*Assistant Examiner*—John W Lee
(74) *Attorney, Agent, or Firm*—Dirk Brinkman; Gene Vinokur

(57) ABSTRACT

A method and system determines a pose of an object by comparing an input range image acquired of a scene including the input object to each of a set of reference range image of a reference object, such that each reference range images has an associated different pose, and the reference object is similar to the input object. Then, the pose associated with the reference range image which best matches the input range image is selected as the pose of the input object.

16 Claims, 7 Drawing Sheets

100

Algorithm 1 Signed EDT $coord(p)$ = coordinates of the closest edge $e$ found to far
$value(p)$ = signed distance value to $e$

Require: $value(b) = -(m+1)$ $\forall b \in$ background
Require: $value(f) = +(m+1)$ $\forall f \in$ foreground
Require: $value(e) = 0$ $\forall e \in$ edge
Require: $coord(p) = (x_p, y_p)$ $\forall p \in$ image
  for all iterations $m$ do
    for all pixels $p$ do
      for all direct neighbors $n$ of $p$ do
        if $distance(p, coord(n)) < |value(p)|$ then
          $value(p) = signed\_distance(p, coord(n))$
          $coord(p) = coord(n)$

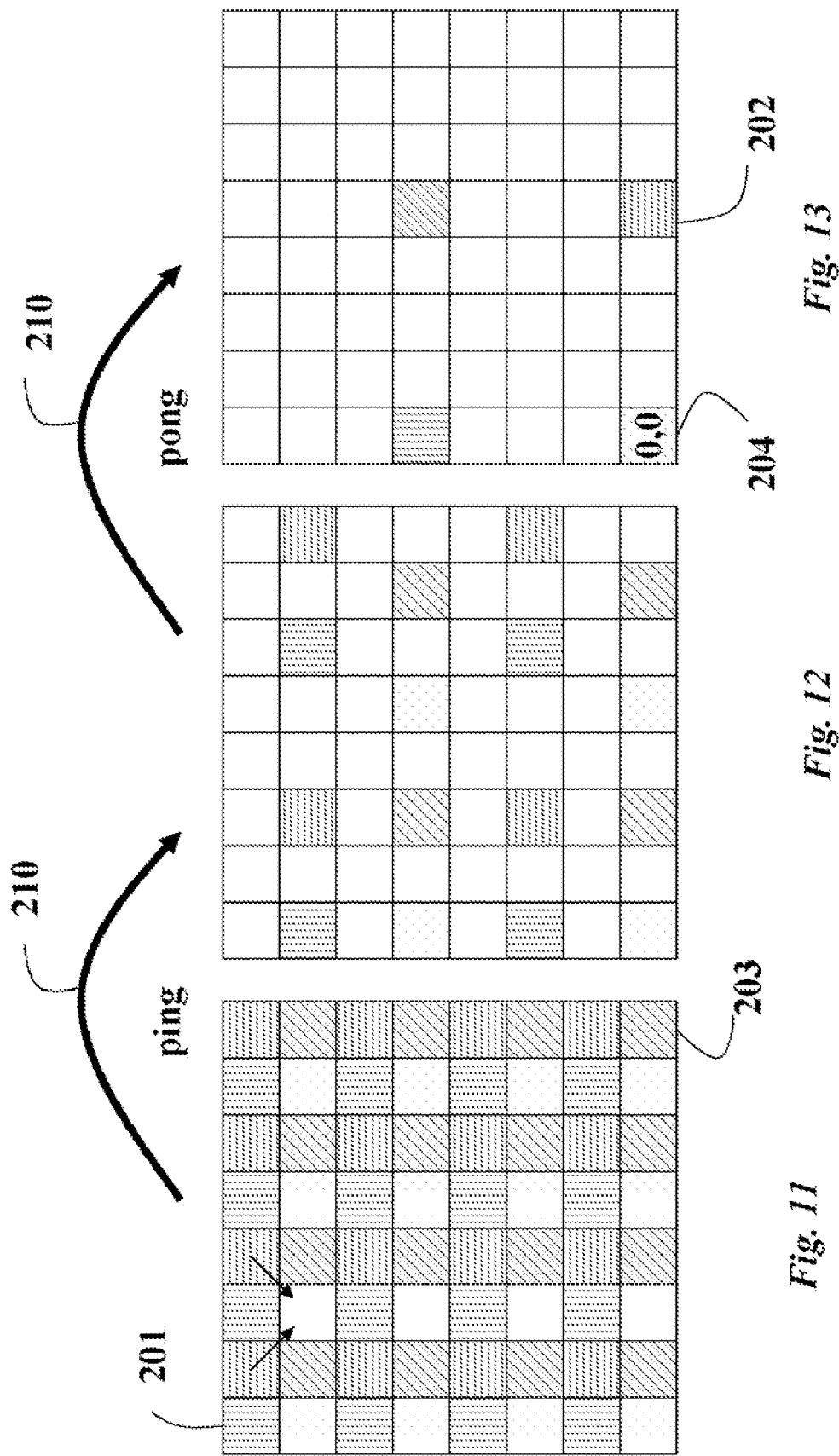

METHOD AND SYSTEM FOR DETERMINING OBJECTS POSES FROM RANGE IMAGES

FIELD OF THE INVENTION

This invention relates generally to computer vision and more particularly to determining poses of objects front images acquired of the objects.

BACKGROUND OF THE INVENTION

A common task in computer vision applications is to estimate a pose of objects from images acquired of a scene. Herein, pose is defined as the 6-DOF location and orientation of an object. Pose estimation in scenes with clutter, e.g., unwanted objects and noise, and occlusions, e.g., due to multiple overlapping objects, can be quite challenging. Furthermore, pose estimation in 2D images and videos is sensitive to illumination, shadows, and lack of features, e.g., objects without texture.

Pose estimation from range images, in which each pixel includes an estimate of a distance to the objects, does not suffer from these limitations. Range images can be acquired with active light systems, such as laser range scanners, or active light stereo methods. Range images are often called range maps. Hereinafter, these two terms are synonymous.

If a 3D model of the objects is available, then one can use model-based techniques, where the 3D model of the object is matched to the images or range images of the scene. Model-based pose estimation has been used in many applications such as object recognition, object tracking, robot navigation, and motion detection.

The main challenge in pose estimation is invariance to partial occlusions, cluttered scenes, and large pose variations. Methods for 2D images and videos generally do not overcome these problems due to their dependency on appearance and sensitivity to illumination, shadows, and scale. Among the most successful attempts are methods based on global appearance, and methods based on local 2D features. Unfortunately, those methods usually require a large number of training examples because they do not explicitly model local variations in the object structure.

Model-based surface matching techniques, using a 3D model have become popular due to the decreasing cost of 3D scanners. One method uses a viewpoint consistency constraint to establish correspondence between a group of viewpoint-independent image features and the object model, D. Lowe, "The viewpoint consistency constraint," International Journal of Computer Vision, volume 1, pages 57-72, 1987. The most popular method for aligning 3D models based purely on the geometry is the iterative closest point (ICP) method, that has recently been improved by using geometric descriptors, N. Gelfand, N. Mitra, L. Guibas, and H. Pottmann, "Robust global registration," Proceeding Eurographics Symposium on Geometry Processing, 2005. However, those methods only address the problem of fine registration where an initial pose estimate is required.

Geometric hashing is an efficient method for establishing multi-view correspondence and object pose due to its insensitivity of the matching time to the number of views. However, the building of the hash table is time consuming and the matching process is sensitive to image resolution and surface sampling.

Another method matches 3D features, or shape descriptors, to range images using curvature features by calculating principal curvatures, Dorai et al., "Cosmos—a representation scheme for 3d free-form objects," PAMI, 19(10): 1115-1130, 1997. That method requires the surface to be smooth and twice differentiable and thus is sensitive to noise. Moreover, occluded objects can not be handled.

Another method uses "spin-image" surface signatures to image a surface to a histogram, A. Johnson and M Hebert, "Using spin images for efficient object recognition in cluttered 3d scenes," PAMI, 21(5):433-449, 1999. That method yields good results with cluttered scenes and occluded objects. But their method is time-consuming, sensitive to image resolution, and might lead to ambiguous matches.

Another method constructs a multidimensional table representation, referred to as tensors, from multiple unordered range images, and a hash-table based voting scheme is used to match the tensor to objects in a scene. That method is used for object recognition and image segmentation, A. Mian, M. Bennamoun, and R. Owens, "Three-dimensional model-based object recognition and segmentation in cluttered scenes," PAMI, 28(12): 1584-1601, 2006. However, that method requires fine geometry and has runtime of several minutes, which is inadequate for real-time applications.

SUMMARY OF THE INVENTION

Object pose (location and orientation) estimation is a common task in many computer vision applications. Although many methods are known, most methods need manual initialization and lack robustness to illumination variation, appearance change, and partial occlusions.

The embodiments of the invention provide a method and system for automatic pose estimation without manual initialization based on shape matching of a 3D model to a range image of a scene. The method includes an error function to compare an input range image to predetermined reference range images of the 3D model of the object at different poses. The method uses data-parallel processing performance of graphics hardware to evaluate and minimize the error function on many range images in parallel.

BRIEF DESCRIPTION OF THE DRAWINGS

FIG. 6 is a block diagram of pseudo code for and extended distance transform according to an embodiment of the invention;

FIGS. 7-10 are block diagrams of the distance field for several iterations according to an embodiment of the invention;

FIG. 11-13 are block diagrams of iterations for determining error values according to an embodiment of the invention;

DETAILED DESCRIPTION OF THE PREFERRED EMBODIMENTS

Method and System Overview

Figure 1:
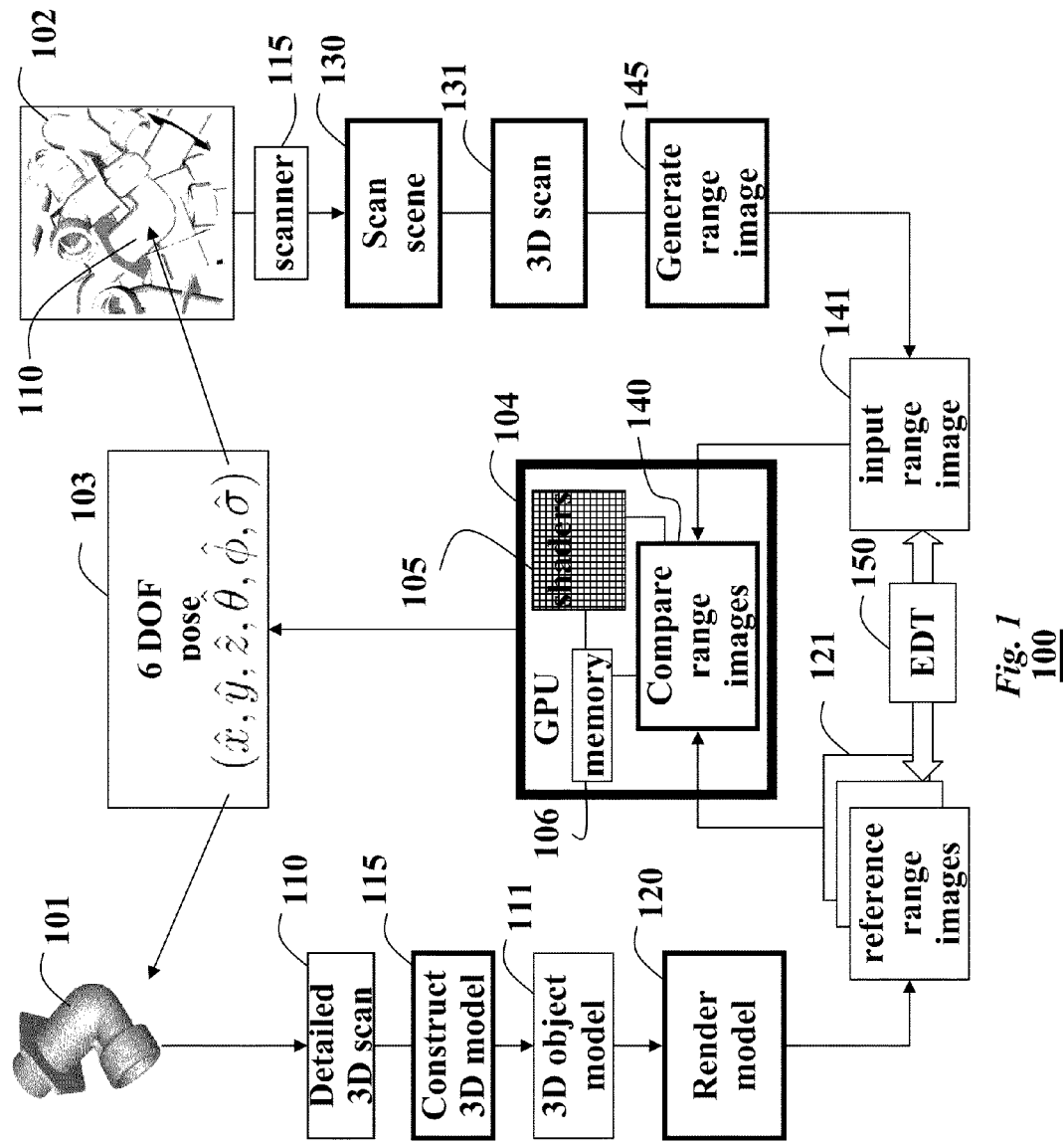
FIG. 1 is a flow diagram of a method for determining a pose of an object from range images according to an embodiment of the invention.

FIG. 1 shows a method and system 100 for determining a pose of an input object 110 of interest from range images 141 according to an embodiment of our invention. The method runs entirely on a graphics processing unit (GPU) 104. The massive data-parallel processing on the GPU makes our method much simpler and more efficient than, more complex CPU-based methods. The method is fully automatic and does not require any initial pose guesses. Even though we compare several thousand reference images, the pose determination takes about one second. Therefore, the method is suitable for real-time applications.

The pose can be used by other applications, for example, a robotic application that mechanically manipulates the object.

Preprocessing

During pre-processing, a reference object of interest 101 is scanned 110 to construct 115 detailed 3D model 111 of the reference object. The reference object 101 is similar to the input object 110. The model 111 can also be constructed by other means, e.g., a CAD system. The model can be in the form of a polygon mesh of vertices. The model 111 is rendered 120 at a number of different poses to produce a set of reference range images 121. In practice, we can use thousands of reference images. Each image has 64×64 pixels. The set of reference range images 121 can be stored in a memory 106 of the GPU 104. These steps are performed only once.

We also can also apply edge detection, and a Euclidian distance transform (EDT) to the reference range images 121. The EDT is described in greater detail below. The result is that our range images are represented as signed distance fields.

Online Processing

During online pose estimation, a scene 103, including the input object 110, and perhaps other known or unknown objects, is scanned 130 to produce a 3D scan 131. We use an active light method, e.g., a laser range scanner 105. Then, we apply a median filter to the 3D scan, edge detection to the smoothed image, and determine a distance field to generate 145 an input range image 141. Note, we do not need to do the smoothing for the detailed scan because the scan data is substantially smooth.

The input range image 141 is compared 140 with the set of reference range images 121 to determine the pose 103 of the object 110 in the scene 102. In one embodiment, we use a parallel implementation of a downhill simplex procedure on the GPU 104.

The task is to find the best match between the reference range images 121 and input range image 141 using error minimization of pairwise comparisons. The best matching reference range image and its translation with respect to the input range image 141 yields our 6-DOF estimation of the pose $(\hat{x}, \hat{y}, \hat{z}, \hat{\theta}, \hat{\phi}, \hat{\sigma})$ 103 of the input object 110.

We describe a novel error function that uses range values and Euclidean distance images. If grey scale or color values are available, then, brightness or color gradients can also be taken into account in the error function. The error function can be evaluated per pixel, which makes it suitable for efficient processing in shader processors 105 of the GPU 104.

Conventionally, shaders are mostly used in computer graphics application and computerized games to produce graphic images from polygon models, e.g., a triangle mesh of vertices, textures, and lighting configurations. A fragment shader typically executes user-programmable GPU code for multiple pixels in parallel.

In contrast, our parallel shaders 105 determine object poses from range images 141. To efficiently minimize the error in the pose, we provide a novel data-parallel version of a downhill simplex procedure that executes entirely on the GPU 104. A conventional simplex procedure is described by J. A. Nelder and R. Mead, "A simplex procedure for function minimization," The Computer Journal, 7(4):308-313, 1965, incorporated herein by reference. We adapt that procedure to execute in parallel, on multiple pixels in the shader processors of the GPU.

The embodiments of the invention provide a simple error metric to compare the alignment of two reference range images with the input range image on the GPU; a method for determining signed Euclidean distance transforms of images on the GPU; a data-parallel implementation of the downhill simplex procedure on the GPU, and an efficient implementation of model-based pose estimation for range images that does not require an initial guess and that executes entirely on the GPU 104.

Range Image Processing

The range image processing steps described below can also be performed during the generation of the reference range images. We start with the input 3D scan 131 of the scene and the 3D model 111 of the reference object 101. We use a range scanner 105. It should be noted that the scanner used for scanning the scene 102 can be of a much lower resolution that the scanner used to acquire the detailed scan.

Both scan are projected orthogonally into the input range image 141, and the reference range images 121, respectively. We select the view points of these orthogonal projections to be the same, making their viewing frustum and image resolution identical.

We know the scale factor between the physical units of the scanner, e.g., mms, to the unit distance of the 3D model 111. This information is readily available from scanner manufacturers. Consequently, the size of the reference object 101 is identical as the size of the object 110 in the input range image 141. This the method is not concerned about scale differences.

Figure 2:
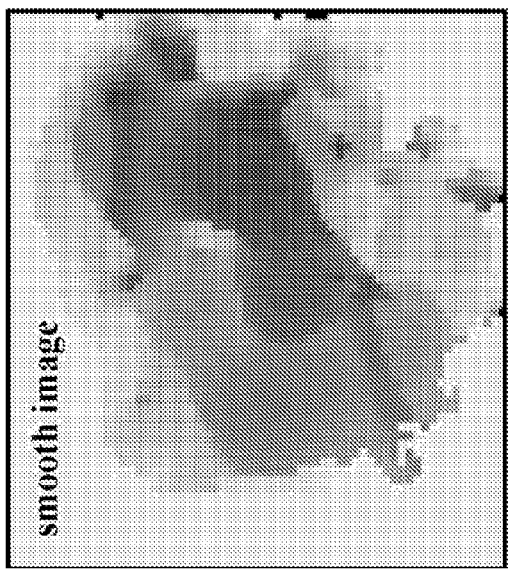
FIG. 2 is a 3D scan image according to an embodiment of the invention.
Figure 3:
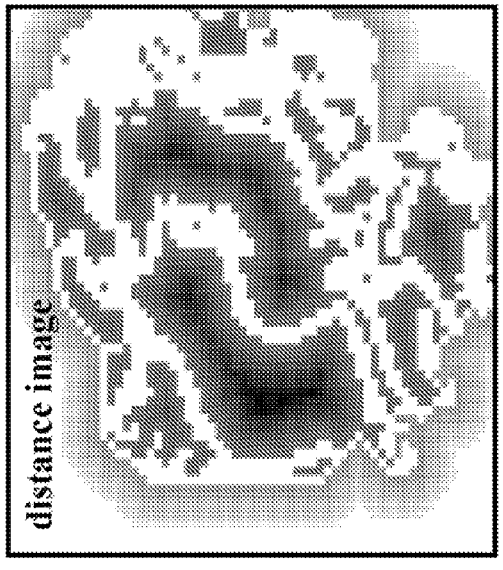
FIG. 3 is a smoothed scan image according to an embodiment of the invention.

FIG. 2 shows the 3D scan 131. The scan is smoothed by applying a median filter with 3/3 mask implemented as a fragment shader. A fragment shader is user-programmable GPU code that is executed for multiple pixels in parallel on the GPU 104. FIG. 3 shows the smoothed image.

Figure 4:
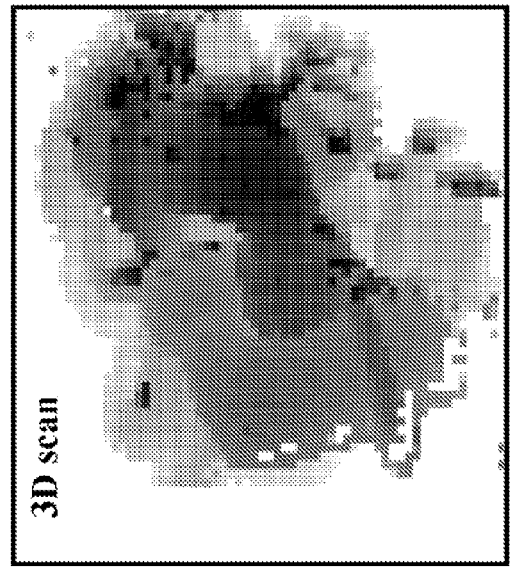
FIG. 4 is an edge image according to an embodiment of the invention.

In a second GPU rendering pass, a heuristic is used to detect object edges by comparing range values of adjacent pixels in the smoothed image. If the range difference exceeds 4% of the image width, then the pixel is marked as an edge. The pixels detected as potential edges are marked with a binary bit for consecutive processing. The edge image is shown in FIG. 4.

Euclidean Distance Transform (EDT)

Next, we apply a signed Euclidean distance transform (EDT) 150 to the edge image. The transform assigns, to each pixel, a signed distance from that pixel to a nearest edge pixel. In one embodiment of the invention, the distance is the Euclidean distance. The EDT helps us to search for the best matching reference image by to constraining the search towards the silhouette (edges) of the reference and input objects.

Figure 5:
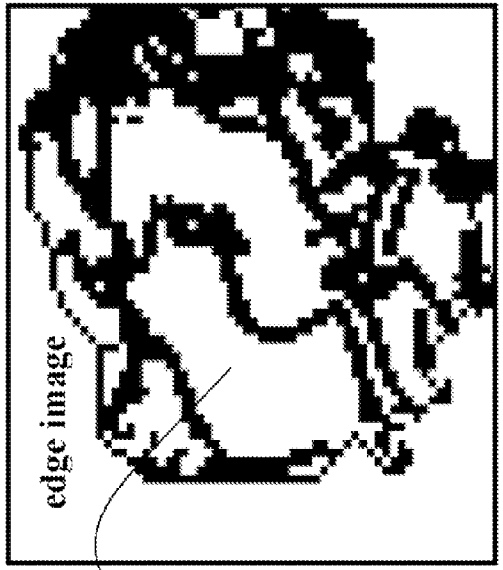
FIG. 5 is a distance field image according to an embodiment of the invention.

This generates a distance field image as shown in FIG. 5. In the distance field image, pixels inside the object have positive distances, pixels outside the object have negative distance, and edge pixels have zero distances. As stated above, the reference range images 121 are also in the form of distance fields. That is the distance field indicates the ranges (z) in the plane (x, y) of the image.

We perform the EDT using conventional "ping-pong" rendering, which uses two RGBA color-textures and consecutively switches their role as rendering source and target, respectively, in our GPU implementation, we use a 32-bit floating point format for each color channel. The values in the first two channels represent the Euclidian coordinates of the nearest edge pixel located so far, the third channel stores its signed distance, and the fourth channel indicates whether an edge pixel is already found.

The distance field can then be combined with the range values in the scan to generate the input range image 141.

FIG. 6 shows the pseudo-code of our EDT procedure. The parameter m determines the number of iterations. The distance values are initialized to $-(m+1)$ for background (b) pixels, i.e., pixels with range value=0, to m+1 for foreground (f) pixels, i.e., pixels with range value no=0), and to 0 for all edge (e) pixels. The first two color channels are initialized to the pixel (p) (x, y) coordinates. In each iteration, the distance value of each pixel is compared to the values of its eight-connected neighboring pixels.

Figures 7, 8, 9, 10:
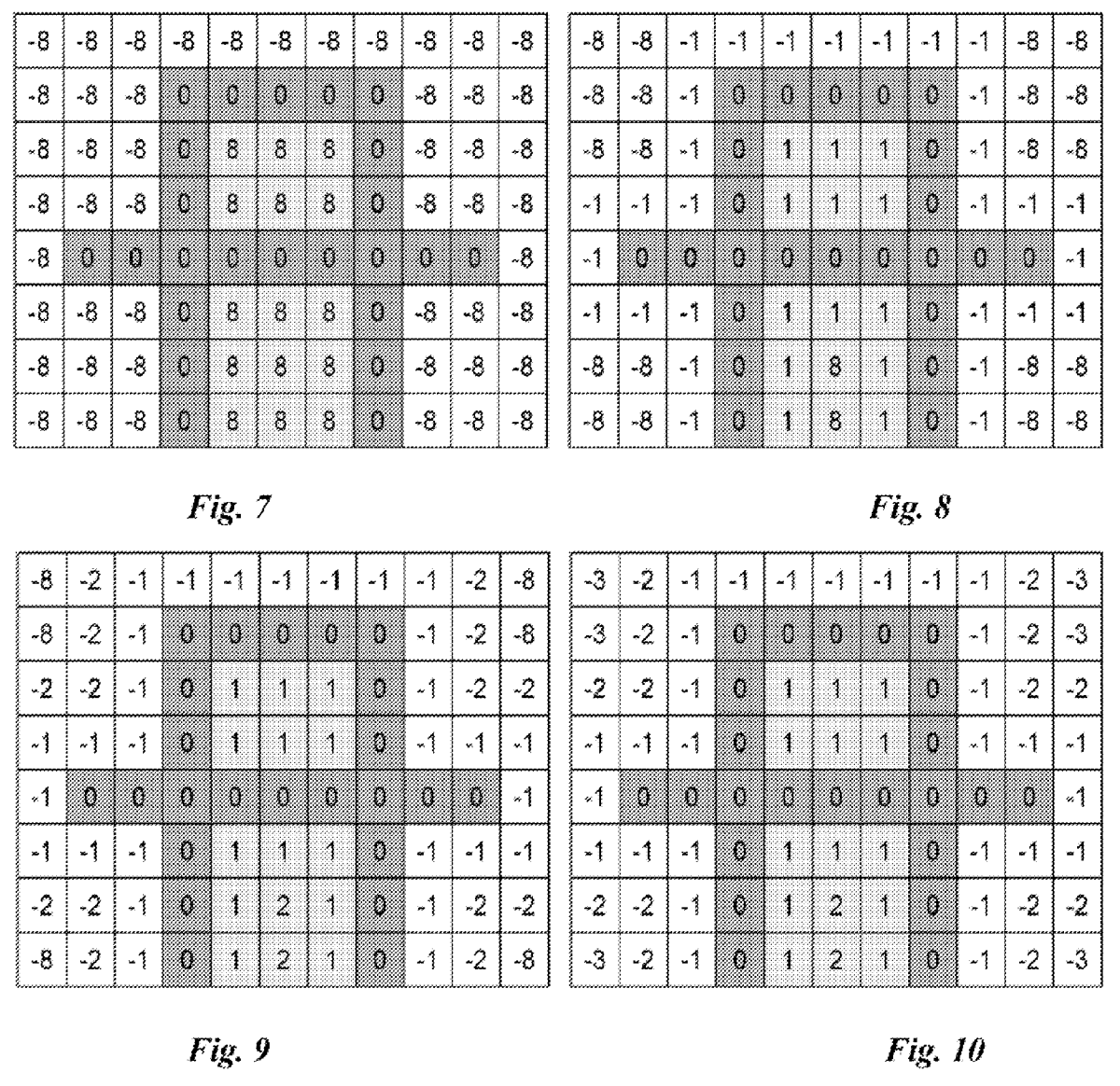

The distance value and coordinates of the current pixel p are updated if the distance from pixel p to the edge pixel e saved in a neighboring pixel n is smaller than, the value saved at pixel p. This information is iteratively propagated over the entire image at each step. FIG. 7 shows the initialization step, and FIGS. 8-10 the next three iterations. The number of iterations m corresponds to the maximum distance of any pixel to its closest edge. For full convergence, we select m to be half the width of the image. However, to decrease processing time, we make use of the fact that the distance of each pixel to an object edge is typically much smaller. Our method does require an exact distance field, an approximation is sufficient. We find empirically that m=7 is sufficient for the 64×64 images that we use.

Error Function

The error function we use to compare one of the reference range images R 121 and the input range image I 141 is:

$$\epsilon(I, R, x, y, z) = \frac{1}{N_{cover}} \sum_{u,v} \epsilon_{cover}(u, v, x, y) + \lambda \frac{1}{N_{depth}} \sum_{u,v} \epsilon_{depth}(u, v, x, y, z), \quad (1)$$

where a cover error is $\epsilon_{cover}(u, v, x, y)$, and a range error is $\epsilon_{range}(u, v, x, y, z)$, see below for details. The error terms are evaluated at each pixel at coordinates (u, v) in the input range image, see below. The translation values (x, y, z) of pixels in the reference range images R 121 determine its position with respect to the input range image I 141. The function uses a weight $\lambda$, and summed up over all image pixels (u, v), e.g., $\lambda=10$. The normalization factors $N_{cover}$ and $N_{range}$ make the error independent of object and image size. The error is minimal if the image R is aligned to a possibly partially occluded object in the input image I.

Cover Error

The cover error of a pixel (u, v) of the input range image $ED_I$ 141, and a pixel in the reference range image $EDT_R$ 121, translated by (x, y) is:

$$\epsilon_{cover}(u, v, x, y) = \begin{cases} |EDT_I(u, v) - EDT_R(u+x, v+y)| \\ \text{if } EDT_R(u+x, v+y) \geq 0 \\ 0 \quad \text{otherwise.} \end{cases} \quad (2)$$

The cover error is minimal when silhouettes of the objects in the images I and R match. Note that only non-background pixels in the reference range image R with positive range values are considered.

The cover error normalization factor is:

$$N_{cover} = |\{(u, v)|EDT_R(u+x, v+y) \geq 0\}|. \quad (3)$$

Range Error Term

The range error compares range values of all pixels in the range images $EDT_I$ and $EDT_R$ that overlap, thus:

$$\epsilon_{depth}(u, v, x, y, z) = \begin{cases} |z_I(u, v) - (z_R(u+x, v+y) + z)| \\ \text{if } EDT_I(u, v) \geq 0 \wedge EDT_R(u+x, v+y) \geq 0 \\ 0 \quad \text{otherwise.} \end{cases} \quad (4)$$

Note that the reference range image $EDT_R$ is translated by (x, y), and that z is added to all range values of the reference range image R.

The range error normalization factor is:

$$N_{depth} = |\{(u, v)|EDT_I(u, v) \geq 0 \wedge EDT_R(u+x, v+y) \geq 0\}|. \quad (5)$$

Implementation on the GPU

The error function in Equation (1) is computed completely on the GPU 104. Using the fragment shaders 105, the pixel-wise comparisons are very fast, especially for low resolution images. In a first step, the input range image I and the reference range image R are stored in the memory 106 of the GPU. The fragment shaders 105 determines the error terms $\epsilon_{cover}(u, v, x, y)$ and $\epsilon_{range}(u, v, x, y, z)$ for each pixel.

Two binary bits $n_{cover}$ and $n_{range}$, used respectively for the normalization factors of Equations (3) and (5), indicate that an error value was computed. All values are stored to the 32-bit color channels of a texture map S of the GPU.

In a second step, the error values are summed over all pixels of the texture map S, and the final error is computed. This summation is performed for each optimization iteration. We implemented the procedure on the GPU using ping-pong rendering between the texture map S and a temporary texture T.

Beginning with a step size s=1, one color channel of pixel (u, v) stores the sum of the values of the pixels (u, v), (u+s, v), (u+s, v+s), (u, v+s) by rendering from textures S to T. Subsequently, s is doubled in each iteration, and S and T are exchanged, as shown in FIGS. 11-13. In each iteration k, information at the current pixel (stippled) 204 is collected from the upper left ((horizontal) 201, upper right (vertical) 202, and right (diagonal) 203 neighboring pixels at distance s=2k. The final result of the error function is stored at pixel (0, 0) 204 after s=log(l) steps 210, where l is the image width, in pixels. This procedure is very efficient for our square images.

Parallel Optimization Framework

The goal of the error optimization is to find the pose parameters:

$(\hat{x}, \hat{y}, \hat{z}, \hat{\theta}, \hat{\phi}, \hat{\sigma})$, which globally minimize the error between the input and reference range images. Thus, we are solving the following 6-DOF optimization problem:

$$(\hat{x}, \hat{y}, \hat{z}, \hat{\theta}, \hat{\phi}, \hat{\sigma}) = \underset{\theta,\phi,\sigma}{\operatorname{argmin}} \underbrace{(\underset{x,y,z}{\min} \epsilon(I, R_{\theta,\phi,\sigma}, x, y, z))}_{\text{step 2}}, \quad (6)$$

where R is a reference range image of the 3D model rendered with rotation angles ($\theta$, $\phi$, $\sigma$). Step 1 determines the error between each reference range image and the input range image using the downhill simplex procedure for the translation values (x, y, z), see Nelder et al. Step 2 selects the associated pose of the reference range image R with the lowest global error. The result is the estimated pose ($\hat{x}, \hat{y}, \hat{z}, \hat{\theta}, \hat{\phi}, \hat{\sigma}$) 103 of the input object 110 in the scene 102.

Figure 14:
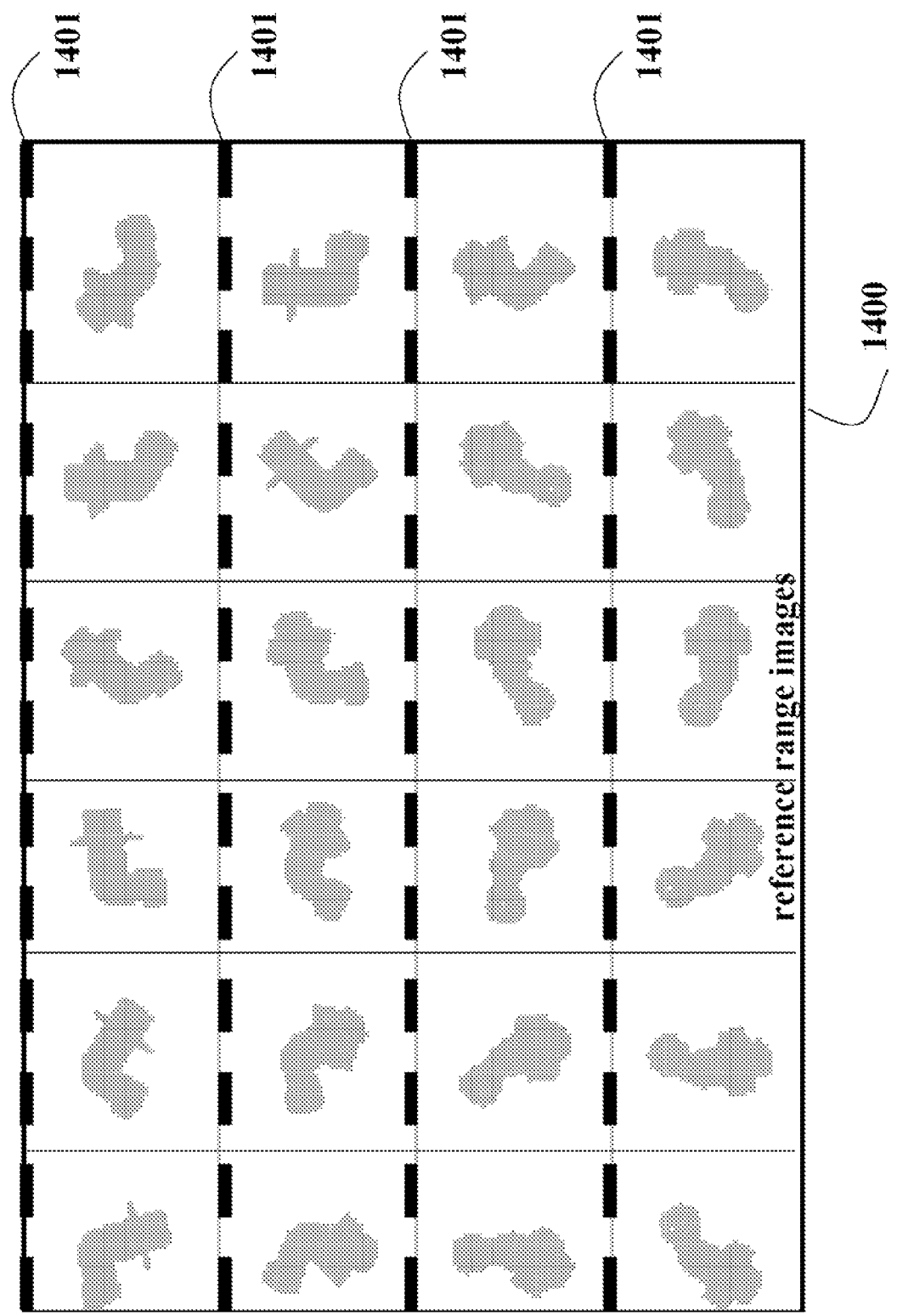
FIG. 14 is a block diagram of a matrix storing reference range images according to an embodiment of the invention.

As shown in FIG. 14, during pre-processing, we determine one large texture, the reference texture matrix 1400, to store all the reference range images. The number of reference range images influences the precision and speed of our pose estimation method. The more reference range images we store, the better our angular pose estimate and the slower the method. The number of reference images the can be stored also depends on a size of the texture memory.

To address this issue, we use a greedy simplex procedure. We render the object using orthonormal projections, and store the z-buffer as the reference range images. Then, we rotate the object by ($\theta$, $\phi$, $\sigma$) with very small rotation increments, e.g., five degrees. For each new reference range image, we compute the error according to Equation (1) with respect to all previously stored reference range images. If the error is larger than a user-defined threshold, then we add the range image to the reference texture matrix. Because we do not replace, but only add reference range images, we only have to execute the simplex procedure a small number of times with larger and larger thresholds, until we can fit all range images into the reference texture matrix. We could increase performance by using dynamic programming.

Initial Parameters

Figure 16:
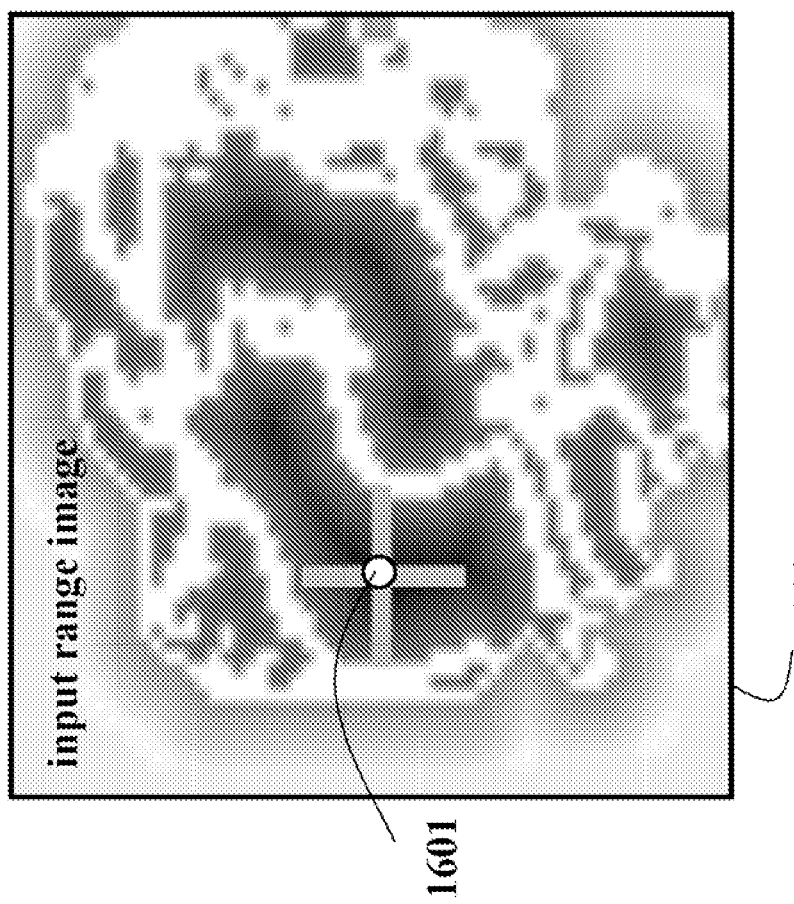
FIG. 16 is an input range image according to an embodiment of the invention.
Figure 15:
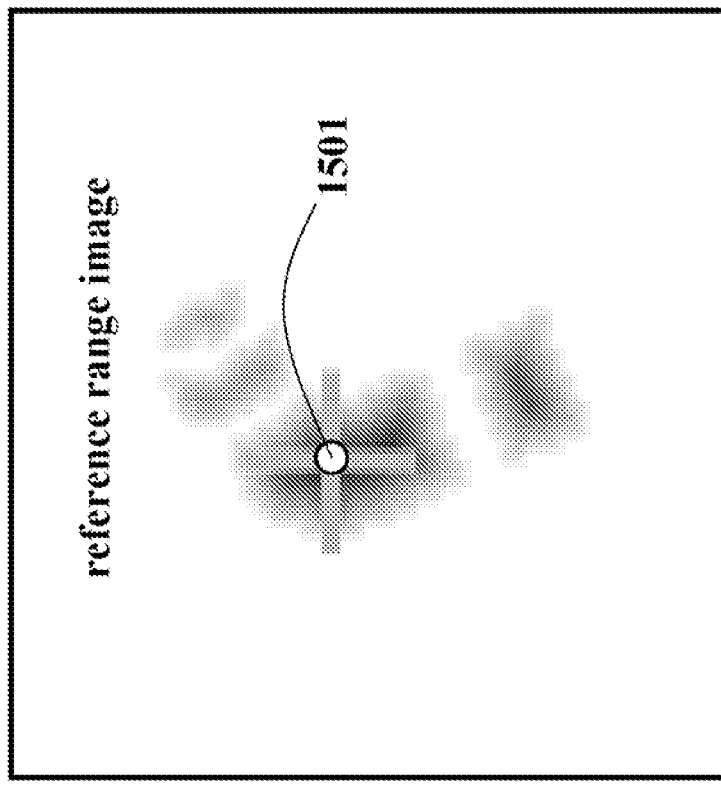
FIG. 15 is a reference range image according to an embodiment of the invention.

The number of iteration the downhill steps, for convergence of the downhill simplex procedure, can be drastically reduced by selecting adequate initial parameters. Because the simplex procedure can end in a local minimum, we estimate the initial parameters ($x_0$, $y_0$, $z_0$) by locating pixels 1501 and 1601 in the images R and I, respectively, that correspond to a center of gravity of the object, as shown in FIGS. 15 and 16.

if the input image I includes multiple objects, then we select the object that is nearest to the scanner, i.e., the image with the largest z value. We use the following heuristic procedure. For each range image, we initialize the center of gravity (u, v) to the first pixel, and iterate over all pixels (r, s). We update (u, v) to the new pixel position (r, s) if:

$$0.5(EDT(u, v) + (z(r, s) - z(u, v))) \geq 0.5 EDT(r, s). \quad (7)$$

The EDT terms force the result to typically be in the center of an object, and the z term forces the result to be nearest to the scanner. The initial translation parameters are then:

$$x_0 = u_I - u_R, \ y_0 = v_I - V_R, \ z_0 = z_P(u_I, v_I) - z_R(u_R, vR). \quad (8)$$

If the initial estimate of the parameters is determined by aligning the range images, then the downhill simplex procedure converges in about 30 to 40 iterations. If we locate the center of gravities, the number of iterations is reduced by a factor of two.

Data Parallel Downhill Simplex on the GPU

To parallelize the downhill simplex procedure for the GPU 104, an additional scan-line 1401 is added to each reference range image in the reference texture matrix 1400, see FIG. 14. We use these scan lines to store the parameters of the downhill simplex algorithm and the error values in different color channels.

The vertices of the simplex are initialized to ($x_0$, $y_0$, $z_0$), ($x_0+d$, $y_0$, $z_0$).

($x_0$, $y_0+d$, $z_0$) and ($I_0$, $y_0$, $z_0+d$), where $x_0$, $y_0$ and $z_0$ are the initial parameters described above. We determine empirically that value for the optimal step size d is 5% of the image width, in terms of pixels.

The optimization procedure is implemented using three fragment shader programs, operating in parallel in 96 shader processors on 64×64 images. The first shader implements the actual downhill simplex algorithm as described by Nelder et al. The second shader computes the error terms of Equations (3) and (4), and the third shader computes the final error value. This loop is executed for each new iteration of the downhill simplex algorithm. Finally, the topmost scan lines of all reference range images are read out by the CPU. The pose parameters ($\hat{x}, \hat{y}, \hat{z}, \hat{\theta}, \hat{\phi}, \hat{\sigma}$) of the reference range image with the lowest error are the pose of 103 the object.

EFFECT OF THE INVENTION

Our method determines a pose of an object from range images that exploits the parallelism of GPUs, We can locate objects in complex scenes and can correctly estimate their pose without initial guess. Our method is not affected by local minima because we compute the errors for all reference range images and then select the best for the pose determination.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a pose of an object, comprising the steps of:

comparing an input range image acquired of a scene including an input object to each of a plurality of reference range image of a reference object, such that each reference range images has an associated different pose, and the reference object is similar to the input object, wherein the comparing is performed on a per pixel basis; and selecting the associated pose of the reference range image which best matches the input range image as the pose of the input object in the scene, and wherein the comparing between the reference range image R and the input range image I uses an error function:

$$\epsilon(I, R, x, y, z) = \frac{1}{N_{cover}} \sum_{u,v} \epsilon_{cover}(u, v, x, y) + \lambda \frac{1}{N_{depth}} \sum_{u,v} \epsilon_{depth}(u, v, x, y, z),$$

where a cover error is $\epsilon_{cover}(u, v, x, y)$, a range error is $\epsilon_{range}(u, v, x, y, z)$, (u, v) are coordinated of pixels in the input range image, (x, y, z) are coordinates of pixels in the set the reference range images, $\lambda$ a weight, and $N_{cover}$ and $N_{range}$ are normalization factors. wherein the steps are performed in a graphics processor unit.

2. The method of claim 1, further comprising:
scanning the reference object to construct a 3D model of the reference object; and
rendering the 3D model for the plurality of different poses to generate the set of reference range images.

3. The method of claim 1, further comprising:
scanning the scene to acquire a scan of the input object, the scan having range values;
smoothing the scan to produce a smoothed scan;
detecting edges in the smoothed scan to produce a distance field input image; and
combining the distance field input image with the range values of the scan to generate the input range image.

4. The method of claim 1, in which a best matching reference range image is selected using a downhill simplex procedure.

5. The method of claim 1, in which the cover error of the pixel (u, v) of the input range image and a pixel (x, y, z) in the reference range image for a Euclidean distance transform (EDT) is $$\epsilon_{cover}(u, v, x, y) = \begin{cases} |EDT_I(u, v) - EDT_R(u+x, v+y)| \\ \text{if } EDT_R(u+x, v+y) \geq 0 \\ 0 \quad \text{otherwise.} \end{cases}$$

6. The method of claim 1, in which the cover error is minimal when silhouettes of the input object in the input range image and the reference object in the reference image match.

7. The method of claim 1, in which the cover error normalization factor is:

$$N_{cover} = |\{(u, v) EDT_R(u+x, v+y) \geq 0\}|.$$

8. The method of claim 1, in which range error is:

$$\epsilon_{depth}(u, v, x, y, z) = \begin{cases} |z_I(u, v) - (z_R(u+x, v+y) + z)| \\ \text{if } EDT_I(u, v) \geq 0 \wedge EDT_R(u+x, v+y) \geq 0 \\ 0 \quad \text{otherwise.} \end{cases}$$

9. The method of claim 8, in which the range error values of all pixels in the reference range images I and the input range image R that overlap.

10. The method of claim 1, in which the range error normalization factor is:

$$N_{depth} = |\{(u, v) | EDT_I(u, v) \geq 0 \wedge EDT_R(u+x, v+y) \geq 0\}|.$$

11. The method of claim 1, in which the best match minimizes the error function $$(\hat{x}, \hat{y}, \hat{z}, \hat{\theta}, \hat{\phi}, \hat{\sigma}) = \underset{\theta,\phi,\sigma}{\operatorname{argmin}} \underbrace{(\underbrace{\min_{x,y,z} \epsilon(I, R_{\theta,\phi,\sigma}, x, y, z))}_{step\ 1}}_{step\ 2}$$

where R is the reference range image of the 3D model rendered with rotation angles(θ, ϕ, σ), and step 1 determines an error between each reference range image and the input range image using a downhill simplex method for the translation values (x, y, z), and step 2 selects the associated pose of the reference range image R with a lowest global error.

12. The method of claim 11, in which parameters of the error function are minimized by locating pixels in the reference range images R and the input range image I, that corresponds to a center of gravity of the reference object and the input object, respectively.

13. The method of claim 1, in which the scene includes multiple objects, and further comprising:
selecting a nearest object in the scene as the input object.

14. The method of claim 1, in which a Euclidian distance transform is applied to each input range image.

15. The method of claim 1, in which the comparing step is performed in a graphic processor unit.

16. The method of claim 1, in which multiple reference range images are compared in parallel with the input range image in a plurality of shader processors of a graphic processing unit.

* * * * *